US007028181B1

(12) United States Patent
McCullough et al.

(10) Patent No.: US 7,028,181 B1
(45) Date of Patent: Apr. 11, 2006

(54) SYSTEM AND METHOD FOR EFFICIENT AND SECURE REVOCATION OF A SIGNATURE CERTIFICATE IN A PUBLIC KEY INFRASTRUCTURE

(75) Inventors: Vincent J. McCullough, Chantilly, VA (US); Kenneth W. Aull, Fairfax, VA (US)

(73) Assignee: Northrop Grumman Corporation, Los Angeles, CA (US)

( * ) Notice: Subject to any disclaimer, the term of this patent is extended or adjusted under 35 U.S.C. 154(b) by 826 days.

(21) Appl. No.: 09/704,418

(22) Filed: Nov. 1, 2000

Related U.S. Application Data (60) Provisional application No. 60/210,467, filed on Jun. 9, 2000, provisional application No. 60/229,336, filed on Sep. 1, 2000.

(51) Int. Cl.
*H04L 9/00* (2006.01)

(52) U.S. Cl. ............ 713/156; 713/157; 713/158; 380/277; 705/76
(58) Field of Classification Search ........ 713/156–158, 713/176; 380/277, 55; 705/76; 382/137; 700/232
See application file for complete search history.

(56) References Cited

U.S. PATENT DOCUMENTS

| | | | |
|---|---|---|---|
| 5,687,235 A * | 11/1997 | Perlman et al. ............. | 713/158 |
| 5,717,758 A | 2/1998 | Micall | |
| 5,774,552 A * | 6/1998 | Grimmer ..................... | 713/156 |
| 5,793,868 A | 8/1998 | Micali | |

(Continued)

FOREIGN PATENT DOCUMENTS

EP 0 862 105 A 9/1998

(Continued)

OTHER PUBLICATIONS

Approved procedures and mechanisms for the protection of electronic data communications, TBSS, version 1.2 English, Dec. 6, 1996. pp. 11-1 to 11-38.*

(Continued)

*Primary Examiner*—Christopher Revak
*Assistant Examiner*—Taghi T. Arani
(74) *Attorney, Agent, or Firm*—Tarolli, Sundheim, Covell & Tummino LLP (57) ABSTRACT

System and method for revocation of a signature certificate in a Public Key Infrastructure (PKI) that includes an enterprise with one or more servers, a directory, a registration web server, and one or more client platforms that allow users to access the servers of the enterprise. A user may desire to revoke a potentially compromised signature certificate of the user, or a manger of the user may revoke a signature certificate because it has been lost by the user, or the manager no longer desires that the user has access to servers of an enterprise. A user or personal revocation authority (manager) initiates a revocation process by creating an authenticated secure channel with a registration web server. Using the authenticated secure channel, the user or personal revocation authority requests the registration web server revoke a user signature certificate. The registration web server queries a directory to verify that the personal revocation authority is permitted to revoke the signature certificate of the user. The user signature certificate is revoked. The directory is notified by the registration web server of revocation of the user signature certificate. A user entry in the directory is set to a state without a signature certificate. A process for a new signature certificate for the user may now occur.

18 Claims, 5 Drawing Sheets

U.S. PATENT DOCUMENTS

| | | | | |
|---|---|---|---|---|
| 5,982,898 | A | * | 11/1999 | Hsu et al. .................... 713/156 |
| 6,134,328 | A | * | 10/2000 | Cordery et al. ............... 380/55 |
| 6,230,266 | B1 | * | 5/2001 | Perlman et al. ............. 713/158 |
| 6,367,012 | B1 | * | 4/2002 | Atkinson et al. ........... 713/176 |
| 6,438,690 | B1 | * | 8/2002 | Patel et al. ................. 713/156 |
| 6,715,073 | B1 | * | 3/2004 | An et al. .................... 713/156 |
| 2001/0011255 | A1 | * | 8/2001 | Asay et al. .................. 705/76 |
| 2002/0007454 | A1 | * | 1/2002 | Tarpenning et al. ........ 713/156 |

FOREIGN PATENT DOCUMENTS

JP          10-285156         10/1998

OTHER PUBLICATIONS

European Search Report for EP 01 11 2859, dated Nov. 3,2004; completed on Oct. 22, 2004.

* cited by examiner

Prior Art

SYSTEM AND METHOD FOR EFFICIENT AND SECURE REVOCATION OF A SIGNATURE CERTIFICATE IN A PUBLIC KEY INFRASTRUCTURE

CROSS REFERENCE TO RELATED APPLICATIONS

This application claims the benefit of U.S. Provisional Application No. 60/210,467 L filed on Jun. 9, 2000, and U.S. Provisional Application No. 60/229,336 filed on Sep. 1, 2000, the contents of which are expressly incorporated by reference herein.

BACKGROUND

1. Field of the Invention

This invention relates to Public Key Infrastructures (PKI), and more specifically to personal revocation authority in a PKI.

2. Background Information

A public key infrastructure (PKI) is a collection of servers and software that enables an organization, company, or enterprise to distribute and manage thousands of unique public/private cryptographic keys in a manner that allows users to reliably determine the identity of the owner of each public/private key pair. When each member of an enterprise has a unique key, paper-based business processes may be transitioned to an online, electronic equivalent. Public/private key pairs have the property that for any given public key there exists one and only one private key, and vice versa. Public key cryptography (i.e., the ability to publicly distribute the encryption key) can be used to digitally sign documents. If a particular message can be decrypted using one member of the key pair, then the assumption is that the message must have been encrypted using the other member. If only one person knows the key used to perform the encryption of a document in the first place, then the recipients that can decrypt the document can be sure that the sender of the document must be that person.

However, for a digital signature to be meaningful, the recipient of an object signed with the digital signature must first be able to reliably determine the owner and integrity of the key used to sign the object. Public infrastructures accomplish this using an electronic document called a digital certificate. Certificates may contain information identifying the owner of the key pair, the public component of the pair, and the period of time for which the certificate is valid. The certificate may also identify technical information about the key itself, such as the algorithm used to generate the key, and the key length. Certificates are generated by organizations, companies, or enterprises that are responsible for verifying the identity of individuals (or in some instances organizations) to which certificates are issued. The certifying organization is known as a certificate authority. The certificate authority signs each certificate using a private key known only to the certificate authority itself. This allows users of the PKI to verify both the integrity of the certificate and the identity of the authority that issued it. By issuing a certificate, a certificate authority is stating that it has verified that the public key that appears in the certificate (and, by extension, the corresponding private key) belongs to the individual listed in the certificate. The integrity with which the registration process operates is, therefore, of great importance. The process must provide mechanisms for reliably identifying the individual and for verifying that the public key listed in the certificate belongs to that individual.

Figure 1:
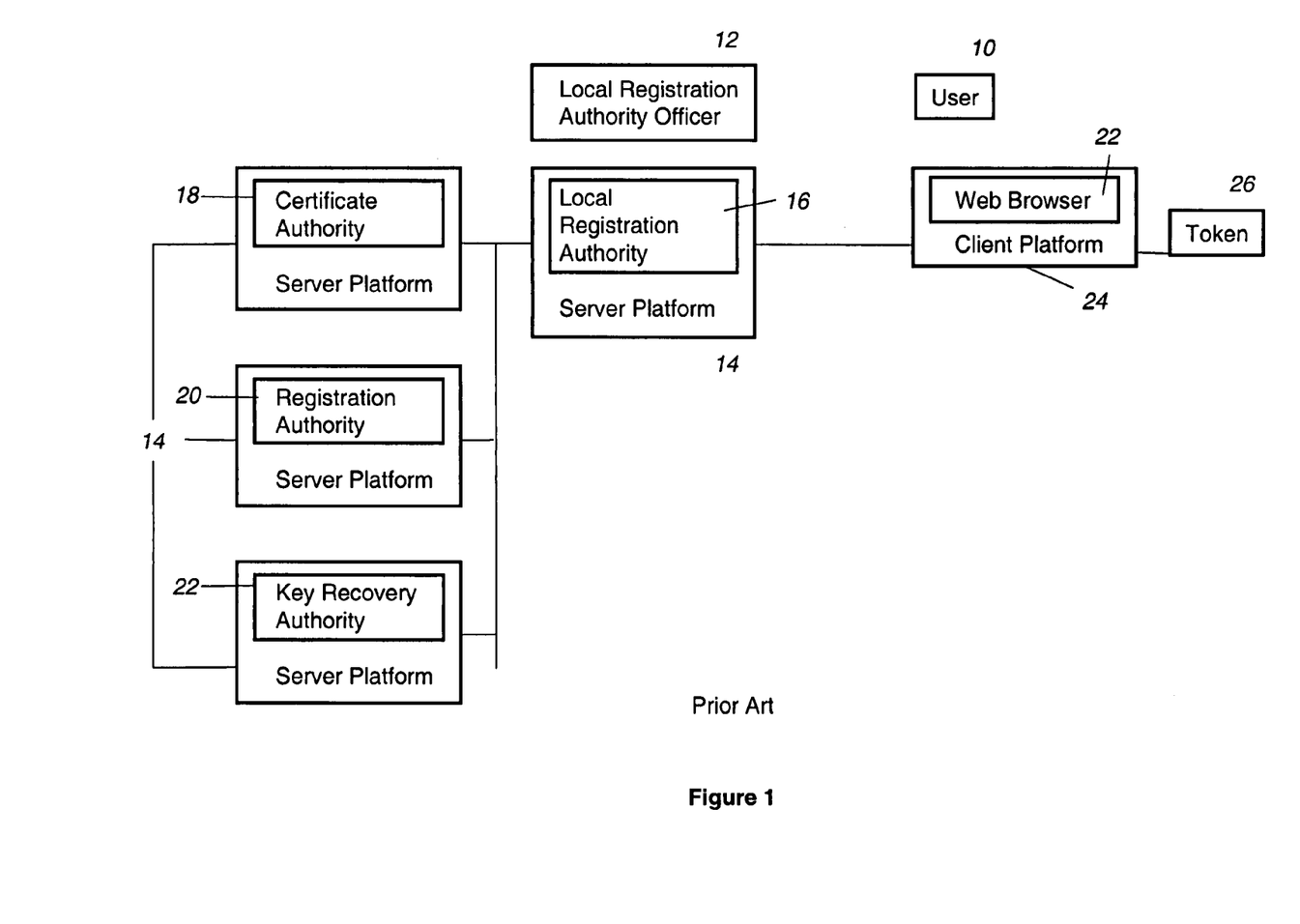
FIG. 1 is a block diagram of an example PKI system architecture.

FIG. 1 shows a block diagram of an example PKI system architecture. Current PKIs that provide strong authentication of user identity accomplish this via the use of a local registration authority officer (LRAO) 12. LRAO 12 operates at a work station or server platform 14 that runs a local registration authority software application 16. Server platform 14 may be any known computing device that may serve as a server, e.g. computer, workstation, etc. The local registration authority application 16 interfaces to other server platforms that may contain applications such as a certificate authority application 18, a registration authority application 20, and/or a key recovery authority application 22. Each application may be on the same server platform, or on separate individual server platforms 14. A user 10, that is using or desires access to the PKI system architecture, accesses the system via a web browser 23 on a client platform 24. A hardware token 26, such as a smart card, may also be operably connecteable to client platform 24. Typically in current systems, user 10 presents a photo I.D. to the local registration authority officer 12 in order to authenticate the user's identity. Local registration authority officer 12 then uses workstation 14 and local registration authority application 16 to signal a registration authority application 20 to register new user 10 in the system. Local registration authority application 16 may be off-the-shelf product software that comes typically bundled with a certificate authority application 18, registration authority application 20, and key recovery authority 22 software.

A public/private key pair is generated by either the local registration authority application 16 or the registration authority application 20 (depending on products chosen and depending on how they've been configured). The public key is sent to certificate authority application 18 to be signed, thereby, generating a certificate for new user 10. A backup copy of the private key may also be sent to key recovery authority application 22, however, normally the private key is kept on a token 26, or at client platform 24 by user 10. Once the public key is sent to a certificate authority 18 and signed, a user signature certificate is generated and provided to a local registration authority server. Local registration authority officer 12 copies the certificate (including the private key) onto a floppy disk, hardware token, or other storage medium, and then provides the user signature certificate and private key to the user.

If an enterprise uses signature certificates, then the signature certificates must be kept secure. One way to increase the security of a signature certificate is to make it very easy for users to revoke and renew a certificate if there is even a hint that the certificate may have been compromised. Further, certificates stored on devices such as smart cards, floppy disks, or hardware tokens may be misplaced. Alternatively, a certificate stored on a hard drive or removable media could become corrupted, and a backup copy might not be available. In either of these cases, the original user 15, signature certificate must be revoked for security reasons, and a new certificate generated for the user. Moreover, in cases of suspected misconduct by a user, one of the first enterprise officers that may become aware of the possible misconduct is often the user's manager. In such cases, the manager may wish to revoke a user's signature certificate immediately.

One would not want to allow just any individual to revoke a signature certificate. Ideally, it may be preferred that only the owner of the certificate be able to revoke their certificate. However, in order to authenticate the identity of the user during the revocation process, the user must present the user signature certificate. After the user is authenticated, the user may be allowed to revoke the certificate. In the case of a lost certificate, a user has no way of authenticating his identity during the revocation process.

Current PKI operating models require a registration authority (RA) which is a process that not only registers a user, but also revokes digital certificates of the user when they are no longer needed. Registration Authorities may be specialized enterprise officers who must be contacted in such cases. This is expensive, in that it requires additional labor via specialized officers, and slow, in that the manager must locate and explain the situation to the officer. Depending on the implementation, the registration authority process can be very impractical for very large PKI implementations.

A registration authority might be a system administrator or security control officer at some geographic location. A registration authority which performs a revocation of certificates may be referred to as a local revocation authority (LRA). Revocation requests are submitted by a user via some method (e.g., paper, email, web, etc.) to the LRA. The revocation requests are queued for work off within some specified time frame.

Current public key infrastructures for revoking digital certificates have some problems. First, for large organizations, the cost to implement systems similar to that shown in FIG. 1 are high due to the need for multiple local registration authority officers to handle the large number of users that may reside at various locations. Generally, certificate revocation requests are submitted via some method (paper, email, web, etc.) to the local registration authority. The certificate revocation requests are queued for working off by the local registration authority officers. Current systems are inefficient because request queues will be subject to human intervention. The normal certificate revocation process involves actions by the requester (i.e., user) and the local registration authority. After some time and effort, the requester receives notification of revocation of the digital certificate. This time may be dependent on the number of requests in the queue and/or the efficiency of the local registration authority officers. Thus, current systems and processes are less secure because of the potential lag in time between a revocation request and deletion of the certificate from the PKI directory.

Moreover, current systems are less secure because a relationship between the requester and the local registration authority officer does not necessarily exist and, therefore, presents opportunity for an intruder to exploit. In addition, current systems are less secure since without a manager of the user (or some other individual who may personally know the user), in the process flow, there is no definitive proof who the pin and password (required for generation of new digital certificates) given to the user is issued to.

Therefore, a good PKI implementation must provide a secure and timely method to revoke digital certificates when there is a threat of compromise, a certificate is lost, or when situations necessitate that an individual's access be denied. Further, it is desired to reduce the labor and time necessary to revoke digital certificates.

The revocation and replacement process must not be too easy, otherwise hackers may perpetrate a denial of service attack by randomly revoking user's certificates. Currently, there has generally been no way to revoke and replace a certificate so that the process is both easy and secure.

Therefore, a need exists for an efficient, speedy, and secure revocation process for revoking digital signature certificates of users in a PKI.

SUMMARY

The present invention is directed to a method for revocation of a signature certificate in a Public Key Infrastructure (PKI) that includes: creating an authenticated secure channel with a registration web server; requesting the registration web server revoke a user signature certificate, where the requesting occurs over the authenticated secure channel; revoking the user signature certificate; notifying a directory by the registration web server of revocation of the user signature certificate; and setting a user entry in the directory to a state without a signature certificate.

The present invention is also directed to an article comprising a storage medium having instructions stored therein, where the instructions when executed cause a processing device to perform: creating an authenticated secure channel with an entity; receiving a request from the entity to revoke a user signature certificate; revoking the user signature certificate; and notifying a directory of revocation of the user signature certificate.

The present invention is further directed to a system for revocation of a signature certificate in a Public Key Infrastructure (PKI) that includes: one or more servers operably connected to a network; a directory operably connected to the network, where the directory contains information on one or more users; one or more client platforms operably connected to the network, where the users have access to the servers from the client platforms; and a registration web server operably connected to the network. The registration web server receives a request for revocation of a user signature certificate from an entity. The registration web server revokes the user signature certificate only if the entity is permitted to revoke the user signature certificate. The registration web server notifies the directory of revocation of the user signature certificate if revoked.

BRIEF DESCRIPTION OF THE DRAWINGS

The present invention is further described in the detailed description which follows in reference to the noted plurality of drawings by way of non-limiting examples of embodiments of the present invention in which like reference numerals represent similar parts throughout the several views of the drawings and wherein.

DETAILED DESCRIPTION

The particulars shown herein are by way of example and for purposes of illustrative discussion of the embodiments of the present invention. The description taken with the drawings make it apparent to those skilled in the art how the present invention may be embodied in practice.

Further, arrangements may be shown in block diagram form in order to avoid obscuring the invention, and also in view of the fact that specifics with respect to implementation of such block diagram arrangements is highly dependent upon the platform within which the present invention is to be implemented, i.e., specifics should be well within purview of one skilled in the art. Where specific details (e.g., circuits, flowcharts) are set forth in order to describe example embodiments of the invention, it should be apparent to one skilled in the art that the invention can be practiced without these specific details. Finally, it should be apparent that any combination of hard-wired circuitry and software instructions can be used to implement embodiments of the present invention, i.e., the present invention is not limited to any specific combination of hardware circuitry and software instructions.

Although example embodiments of the present invention may be described using an example system block diagram in an example host unit environment, practice of the invention is not limited thereto, i.e., the invention may be able to be practiced with other types of systems, and in other types of environments (e.g., servers).

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Figure 2:
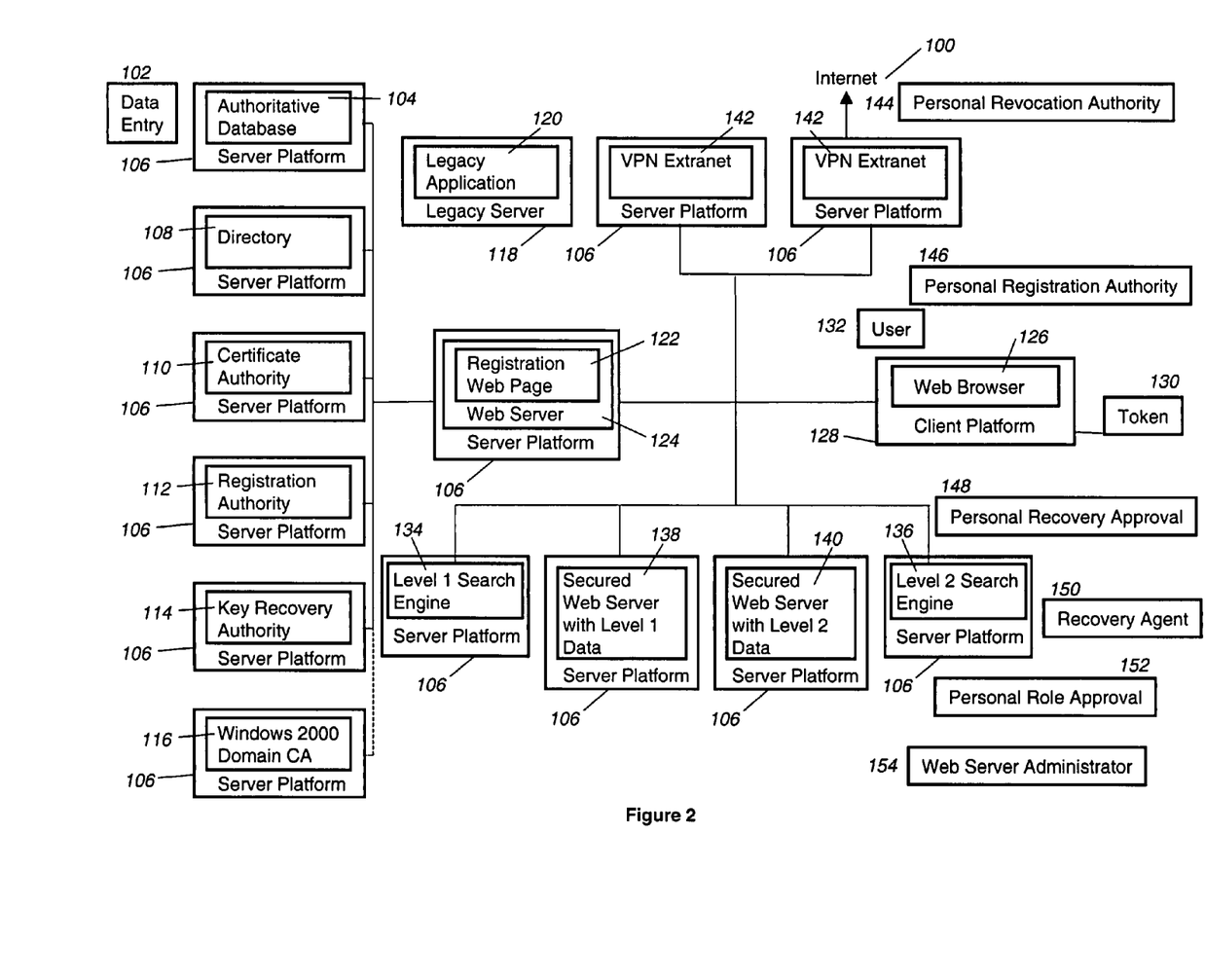
FIG. 2 is a block diagram of an exemplary system architecture in which PKI processes may be practiced according to an example embodiment of the present invention.

FIG. 2 shows a block diagram of an exemplary system architecture 100 in which Public Key Infrastructure (PKI) processes may be practiced according to an example embodiment of the present invention. The present invention is not limited to the system architecture 100 shown in FIG. 2. The boxes shown in FIG. 2 represent entities that may be hardware, software, or a combination of the two. The entities are operably connected together on a network. Entities not shown as being connected to the network represent one or more human beings that perform the function denoted inside the box.

System architecture 100 includes Data Entry 102 which performs a data entry function for Authoritative Database 104. Authoritative Database 104 is resident on server platform 106. A server platform 106 is referred to in this description but it should be understood that the present invention is not limited to any particular server architecture. Server platform 106 may be, for example, UNIX or Windows NT servers.

Authoritative database 104 contains information about members of the group or enterprise (e.g., company) for which PKI services in accordance with the present invention may be performed. The present invention is not limited by the structure of the group or enterprise for which information is stored in the authoritative database 104. The information contained in Authoritative database 104 may include, for example, the name, address, telephone numbers, manager's name, employee identification, etc., of the members of the group or enterprise. Directory 108 contains the same information contained in database 104, but is optimized for fast look-up of the information stored therein rather than fast data entry. The information contained in Directory 108 may be accessed faster than accessing the information from database 104. Directory 108 functions similar to an on-line quickly accessible phone book, containing reference information about the members of the group or enterprise stored in authoritative database 104.

Certificate authority 110 may be conventional off-the shelf software executed on server platform 106. Certificate authority 110 provides storage of certificates and related information. This will be described in more detail hereinafter. Registration authority 112 may also be off-the shelf software executable on server platform 106. Registration authority 112 will also be described in more detail hereinafter. Key recovery authority 114 may also be off-the shelf server software executable on Server Platform 106, and may provide the function of recovering keys (e.g., archived or lost keys) for members of the group or enterprise.

A Windows 2000 Domain Certificate Authority (CA) 116 is shown with a dotted line connection to the network and may or may not be part of a system according to the present invention. Windows 2000 is able to use PKI certificates for network single sign-on, but Windows 2000 is designed to use only the Windows Certificate Authority Windows. Therefore, a system according to the present invention may include a conventional Certificate Authority 110 as well as a 2000 Domain CA 116.

Legacy server 118 executes legacy application programs 120. Legacy server 118 may be, without limitation, a main frame, mini-computer, workstation or other server capable of hosting legacy software applications. Legacy software applications generally may not be designed to be inherently interoperable with a PKI. Legacy applications 120 may be accessible on the client side by a custom client 128 such as an emulator or custom database Graphic User Interface (GUI). Examples of emulators are terminal emulators of an IBM 3270 or terminal emulators of a vt100.

Registration web page 122, which may be one or more pages, functions as the user interface to system architecture 100 shown in FIG. 1. Web Server 124 is a software application that serves Web Pages (such as web page 122) or other HTML outputs to a web browser client (such as web browser 126). Web Server 124 may be =any software application that serves Web Pages or HTML outputs such as, for example, Apache, Microsoft Internet Information Server application, etc.

Web browser 126 is resident on client platform 128 which may be any user computer or computing device. Web browser 126 may be a client software application for browsing web pages such as, for example, HTML protocols, XML protocols, or other protocols. Web browser 126 may be programmed to operate with PKI certificates issued by certificate authority 110. Examples of web browsers which have this capability include Netscape Navigator and Microsoft Internet Explorer. The token 130 may be a smart card, a device with a Universal Serial Bus (USB), or other hardware token device capable of generating, storing, and/or using PKI certificates.

A user 132 is a person that uses or desires access to system architecture 100. User 132 may transition through a number of states which include, for example, a new user, a current user, and a former user. A former user is no longer a member of the group or enterprise. System architecture 100 is described with reference to two levels of security with each level corresponding to a different security requirement. The number of the levels of security is not a limitation of the present invention. The level 1 search engine 134 may be a search engine that is permitted to search system architecture 100, but is allowed access to only level 1 data which is the lowest level of security. Level 1 data may be, for example, data which is freely distributable whereas level 2 data may be considered to be proprietary. A Level 2 search engine 136 may be a search engine which is allowed to search both level 1 and level 2 data. A Level N search engine (not illustrated) may be a search engine which is allowed to search through servers possessing Levels 1 through N data.

A secured level server with Level 1 data may be a web server containing only level 1 data that is secured so that users may need to have level 1 access (at least) to access the level 1 servers. A secured web server with level 2 data 140 may be a web server that contains level 2 data that has been secured so that users must have at least level 2 access to access the level 2 servers. A user with level 2 access may have access to both level 1 and level 2 servers. A secured web server with level N data (not illustrated) is a web server that contains level N data which is accessible by users with level N or above. Users with level N or above access may have access to all levels of data up through level N data.

VPN Extranet 142 may be a software application which functions as a network gateway, which as illustrated, may be either to legacy server 118 and legacy application 120 or to an external network such as the Internet. Personal revocation authority 144 may be one or more people that are in charge of revocation of members from system network 100. Personal registration authority 146 may be one or more people that are in charge of registration of members in system network 100. Personal recovery approval 148 may be one or more people that are in charge of obtaining recovery of certificates. A Recovery Agent 150 may be one or more people that perform recovery of certificates and may only recover a certificate if the certificate has first been designated as recoverable by another person. Personal role approval 152 may be one or more people that approve different role functions within the system network 100. A web server administrator may be one or more people that are in charge of various web functions in system network 100.

The present invention relates to systems and methods for efficient and secure revocation of a signature certificate in a public key infrastructure that insures that digital certificates are revoked efficiently and in a timely manner to avoid compromise to an enterprise, and with minimum human intervention, thereby, lowering the PKI operating and maintenance cost.

In systems and methods according to the present invention, a user with a digital signature certificate can request his/her certificate be revoked via a graphical user interface (GUI) when there is a belief that a compromise of the user's signature certificate has occurred. A personal revocation authority (PRA) (i.e., a manager or supervisor of the user) is also provided the capability to revoke a user's signature certificate on the behalf of the user in the case of a lost certificate, or when the manager wishes to deny the user access to the enterprise.

In systems and methods according to the present invention, a PKI directory associates each user with a manager entry, and verifies that a manager desiring to revoke a user's signature certificate is authorized to do so. Once a user's signature certificate has been revoked, the user is denied any further access to resources (e.g., servers) of the enterprise. A user may have one and only one digital signature certificate. Once a user's signature certificate is revoked, the user seeking access to enterprise servers will need to request another signature certificate. Since a second person, i.e., the user's manager, is involved in the issuance of a signature certificate to the user, authorization and control of digital signature certificates is still maintained.

Figure 3:
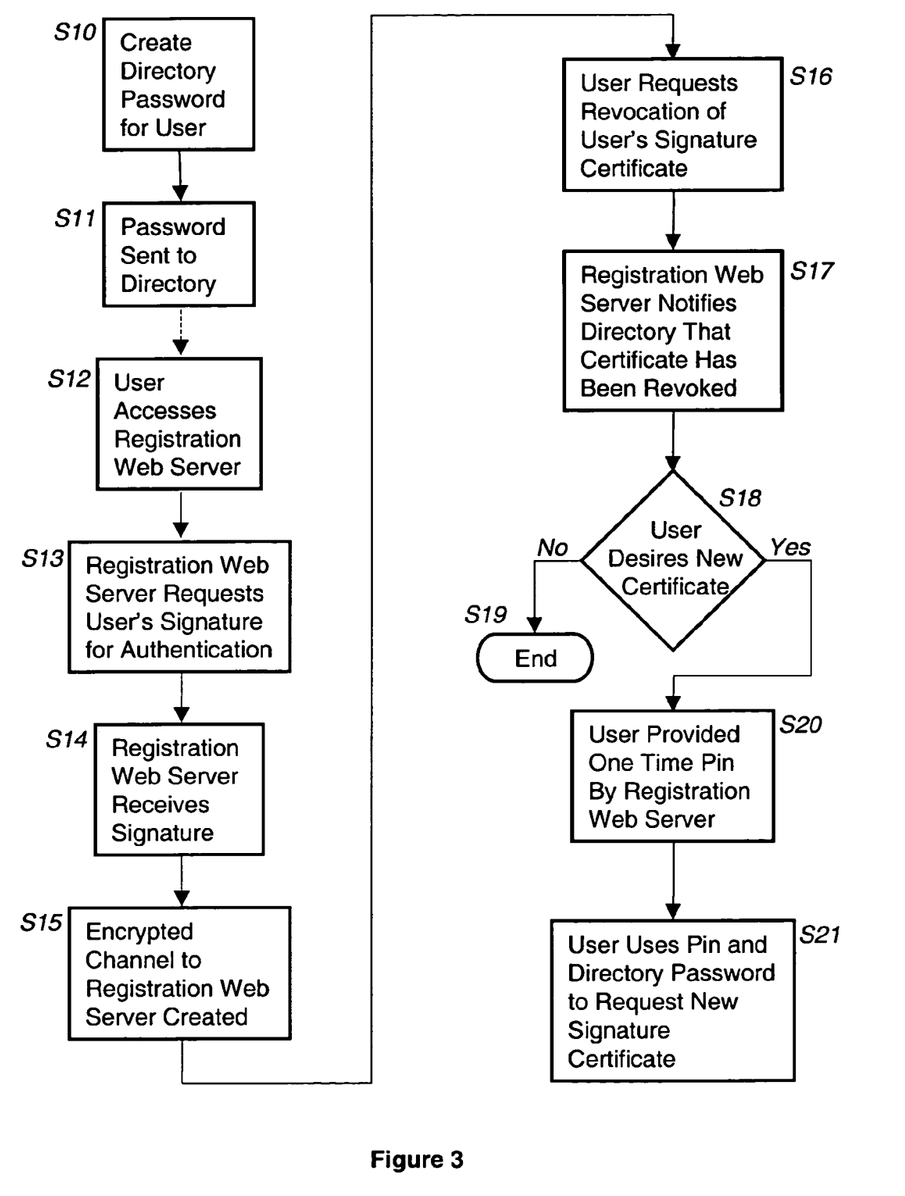
FIG. 3 is a flowchart of an example process for revocation of a compromised signature certificate in a public key infrastructure according to an example embodiment of the present invention.

FIG. 3 shows a flowchart of an example process for revocation of a compromised signature certificate in a public key infrastructure according to an example embodiment of the present invention. Initially, when the user originally generated his/her signature certificate, the user created a directory password, or provided some other form of information known only to the user S10. The password may be sent and stored at a directory S11. The dashed arrows in FIG. 3 between steps S11 and S12 signify that some period of time has elapsed between steps S11 and S12. Now, the user suspects that the user's signature certificate may have been compromised. This may occur because the user believes someone else has access to the user's signature certificate and may use it illegally. Therefore, the user wishes to revoke the user's signature certificate.

The user accesses the registration web server S12. The registration web server requests the user's signature certificate for authentication S13. The user provides the potentially compromised user signature certificate to the registration web server, and the registration web server receives this signature S14. The user has now been authenticated and, therefore, an encrypted channel is created between the registration web server and the user's platform S15. The user requests revocation of the user's signature certificate S16. The registration web server notifies the directory that the user signature certificate has been revoked S17. Then it is determined if the user desires a new certificate S18, and if not, the process terminates S19. If the user desires a new certificate (and this is highly likely), using the same encrypted channel, the user is provided a one time personal identification number (PIN) or password by the registration web server S20. The user may then use the PIN and the directory password, created some time ago, to request a new signature certificate S21. This process is secure since the user has used two pieces of information that only this user would know, the information stored in the directory (i.e., directory password), and the information provided during the revocation process (i.e., PIN) to obtain a new signature certificate. The user is not able to request a new signature certificate until the previous certificate has been revoked.

Figure 4:
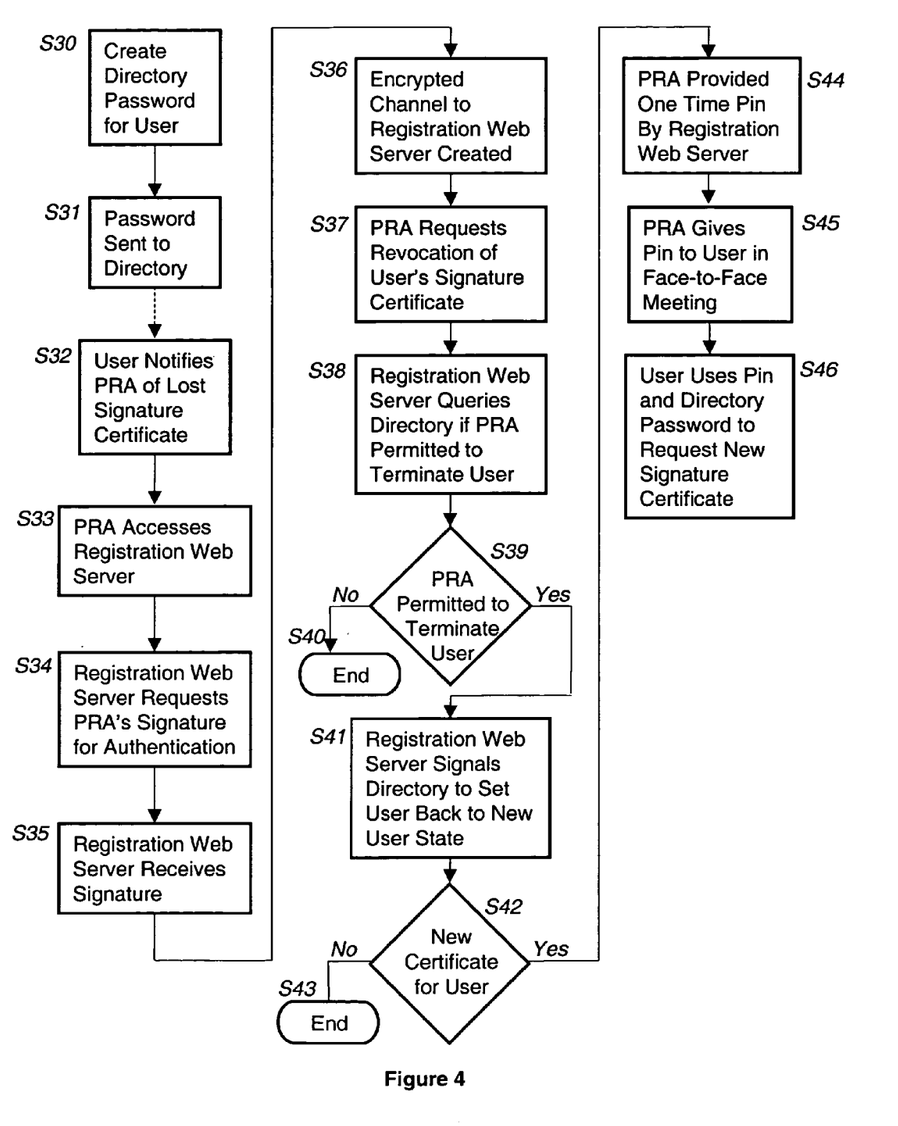
FIG. 4 is a flowchart of an example process for revocation of a lost signature certificate in a public key infrastructure according to an example embodiment of the present invention.

FIG. 4 shows a flowchart of an example process for revocation of a lost signature certificate in a public key infrastructure according to an example embodiment of the present invention. As noted previously, during the time the user initially created a user signature certificate, a directory password for the user was also created S30. The password may be sent to the directory S31. Now, sometime later (denoted by dashed arrow), the user has lost his/her signature certificate and, therefore, notifies a personal revocation authority (PRA) of the lost signature certificate S32. A personal revocation authority may be a manager or supervisor of the user. The personal revocation authority accesses the registration web server S33. The registration web server requests the signature certificate of the personal revocation authority for authentication S34. The registration web server receives the valid signature from the personal revocation authority S35. The PRA is now authenticated. An encrypted channel is then setup to the registration web server S36. The personal revocation authority requests revocation of the users signature certificate S37. The registration web server queries the directory to determine if the personal revocation authority is permitted to terminate the user S38. The directory contains information regarding the user, and one or more managers or supervisors of the user. These managers may serve as personal revocation authorities and be authorized to determine the generation or revocation of signature certificates of the user.

Whether the personal revocation authority is permitted to terminate the user is determined S39, and if not, the process ends S40. If the personal revocation authority is permitted to terminate the user, the registration web server signals the directory that the users signature certificate has been revoked and to set the user's status back to that of a new user (i.e., a user without a signature certificate) S41. It is determined whether the personal revocation authority wants to allow the user to have a new certificate S42. If not, the process terminates S43. Otherwise, the personal revocation authority is provided a one time PIN by the registration web server S44. The personal revocation authority gives the PIN to the user in a face-to-face meeting S44. The user now uses the PIN and the directory password to request a new signature certificate S46.

Figure 5:
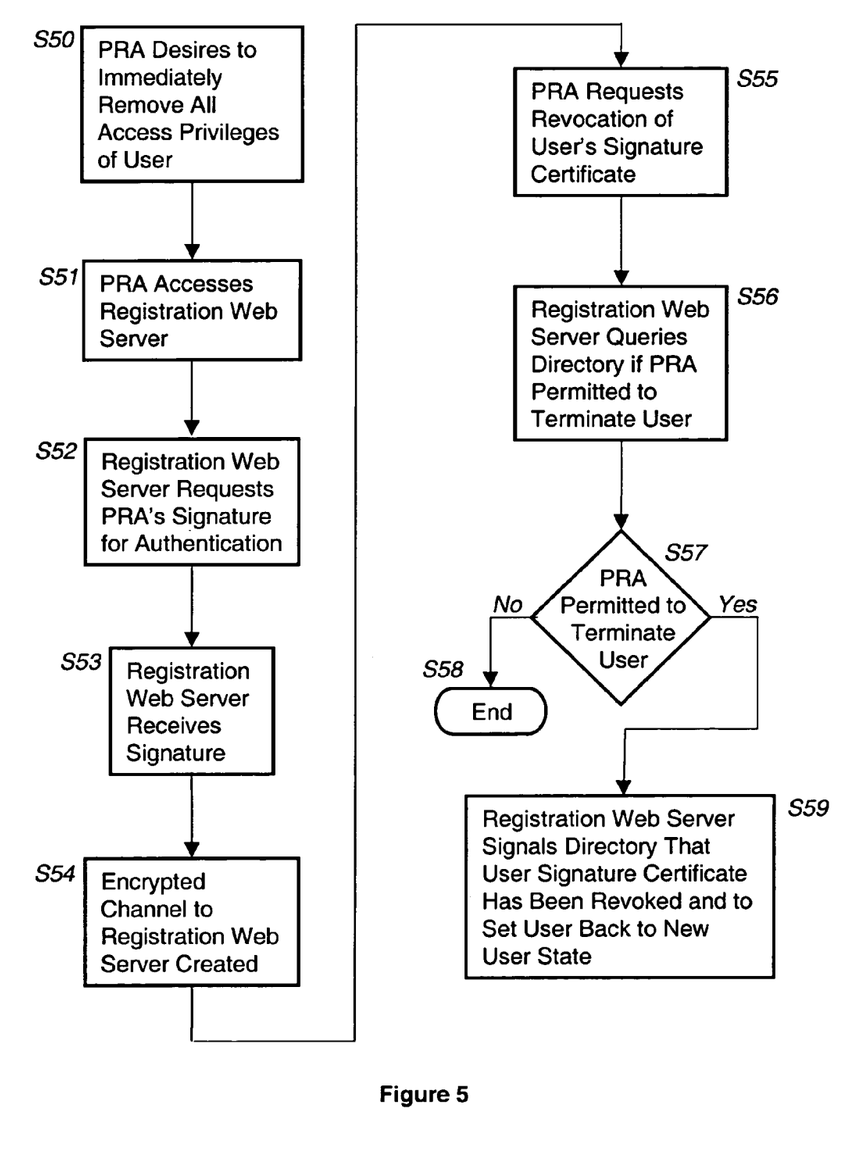
FIG. 5 is a flowchart of an example process for revocation of a signature certificate with prejudice in a public key infrastructure according to an example embodiment of the present invention.

FIG. 5 shows a flowchart of an example process for revocation of a signature certificate with prejudice in a public key infrastructure according to an example embodiment of the present invention. A personal revocation authority desires to immediately all access privileges of a particular user S50. This may be due to the user's misconduct, the user's termination of employment, the suspicion of misconduct by the user, or for other reasons that demand immediate termination of the user's access to resources of the enterprise. The personal revocation authority accesses the registration web server S51. The registration web server requests the personal revocation authority's signature for authentication S52. The registration web server receives the signature of the personal revocation authority S53. An encrypted channel is then created to the registration web server S54. The personal revocation authority then requests revocation of the user's signature certificate S55. The registration web server queries the directory to determine if the personal revocation authority is permitted to terminate the user S56. Whether the personal revocation authority is permitted to terminate the user S57 is determined, and if not, the process ends S58. If the personal revocation authority is permitted to terminate the user, the registration web server signals the directory that the user's signature certificate has been revoked, and to set the user back to a new user state S59. A new user state is a state whereby the user no longer has a signature certificate and cannot access servers of the enterprise without obtaining a signature certificate.

A system or method for efficient secure revocation of a signature certificate in a PKI according to the present invention is advantageous in that it has lower labor costs and is more timely to revoke digital certificates. Systems and methods according to the present invention are also advantageous in that they avoid revocation request queues. Moreover, the user is allowed to revoke his/her certificate to avoid compromise to the enterprise. Further, the present invention allows a manager of the user to revoke the user's certificate on their behalf or when it is necessary to deny the user access to the enterprise.

System and methods for generation of a signature certificate in a public key infrastructure according to the present invention is also advantageous in that it provides cost savings and improved security. Costs are saved in that the present invention reduces paper work by incorporating an electronic process, shortens business process time lines since minimal amount of human intervention is required, and promotes remote collaboration amongst the members of the enterprise. Security is improved since eavesdropping is protected against, spoofing is protected against, and a method or system according to the present invention authenticates a user's identity, including hostile insiders. The advantages of the present invention are accomplished in part since manual processes that current PKI systems use have been replaced with automated processes that accomplish many of the same tasks. System and methods according to the present invention provide a very inexpensive mechanism for implementing a face-to-face meeting as a part of the new user registration process, therefore, providing improved security while at the same time not adding significantly to the cost of the system (e.g., labor costs).

It is noted that the foregoing examples have been provided merely for the purpose of explanation and are in no way to be construed as limiting of the present invention. While the present invention has been described with reference to a preferred embodiment, it is understood that the words which have been used herein are words of description and illustration, rather than words of limitation. Changes may be made within the purview of the appended claims, as presently stated and as amended, without departing from the scope and spirit of the present invention in its aspects. Although the present invention has been described herein with reference to particular methods, materials, and embodiments, the present invention is not intended to be limited to the particulars disclosed herein, rather, the present invention extends to all functionally equivalent structures, methods and uses, such as are within the scope of the appended claims.

What is claimed is:

1. A method for revocation of a signature certificate in a Public Key Infrastructure (PKI) comprising:
   creating an authenticated secure channel with a registration web server;
   requesting the registration web server revoke a user signature certificate, the requesting occurring over the authenticated secure channel;
   revoking the user signature certificate;
   notifying a directory by the registration web server of revocation of the user signature certificate;
   setting a user entry in the directory to a state without a signature certificate; and
   notifying a personal revocation authority that a user has lost a user signature certificate, the notifying occurring before the creating.

2. The method according to claim 1, further comprising generating a directory password for the user during creation of the user signature certificate.

3. The method according to claim 1, wherein the creating and requesting are initiated by the personal registration authority.

4. The method according to claim 3, further comprising requesting a personal registration authority's signature certificate to authenticate the personal registration authority before the creating.

5. The method according to claim 4, wherein the personal registration authority is a supervisor of the user.

6. The method according to claim 4, further comprising querying the directory after the requesting the registration web server revoke the user signature certificate to determine if the personal registration authority is permitted to revoke the user signature certificate.

7. The method according to claim 6, further comprising revoking the user signature certificate by the registration web server only if the personal registration authority is permitted to revoke the user signature certificate.

8. The method according to claim 7, further comprising generating a directory password for the user during creation of the user signature certificate.

9. The method according to claim 8, further comprising sending the user one of a password and a personal identification number (PIN) by the registration web server after the setting of the user entry.

10. The method according to claim 9, further comprising requesting a new signature certificate by the user using the directory password and one of the password and the PIN.

11. The method according to claim 1, wherein the revoking is performed by the registration web server.

12. A server comprising a storage medium having instructions stored therein, the instructions when executed causing a processing device to perform:
   creating an authenticated secure channel between the server and a personal revocation authority;
   receiving a request from the personal revocation authority to revoke a user signature certificate;
   revoking the user signature certificate;
   notifying a directory of revocation of the user signature certificate; and
   notifying the personal revocation authority that a user has lost a user signature certificate, the notifying the personal revocation authority occurring before the creating.

13. The server according to claim 12, further comprising verifying the personal revocation authority is permitted to revoke the user signature certificate.

14. The server according to claim 13, further comprising revoking the user signature certificate only if the personal registration authority is permitted to revoke the user signature certificate.

15. A system for revocation of a signature certificate in a Public Key Infrastructure (PKI) comprising:
   at least one server operably connected to a network;
   a directory operably connected to the network, the directory containing information on at least one user;
   at least one client platform operably connected to the network, the at least one user having access to the at least one server from the at least one client platform; and
   a registration web server operably connected to the network, the registration web server receiving a request for revocation of a user signature certificate from a personal revocation authority over an authenticated secure channel in response to the personal revocation authority being notified that the user has lost a user signature certificate, the registration web server revoking the user signature certificate only if the personal revocation authority is permitted to revoke the user signature certificate, the registration web server notifying the directory of revocation of the user signature certificate if revoked.

16. The system according to claim 15, wherein the information on at least one user includes a user entry related to the user signature certificate, the directory setting the user entry in the directory to a state without a signature certificate if the user signature certificate is revoked.

17. The system according to claim 15, further comprising an authenticated secure channel between the personal revocation authority and the registration web server, the requesting occurring over the authenticated secure channel.

18. The system according to claim 15, wherein the personal revocation authority is a supervisor of the at least one user.

* * * * *